United States Patent Office 3,261,611
Patented July 19, 1966

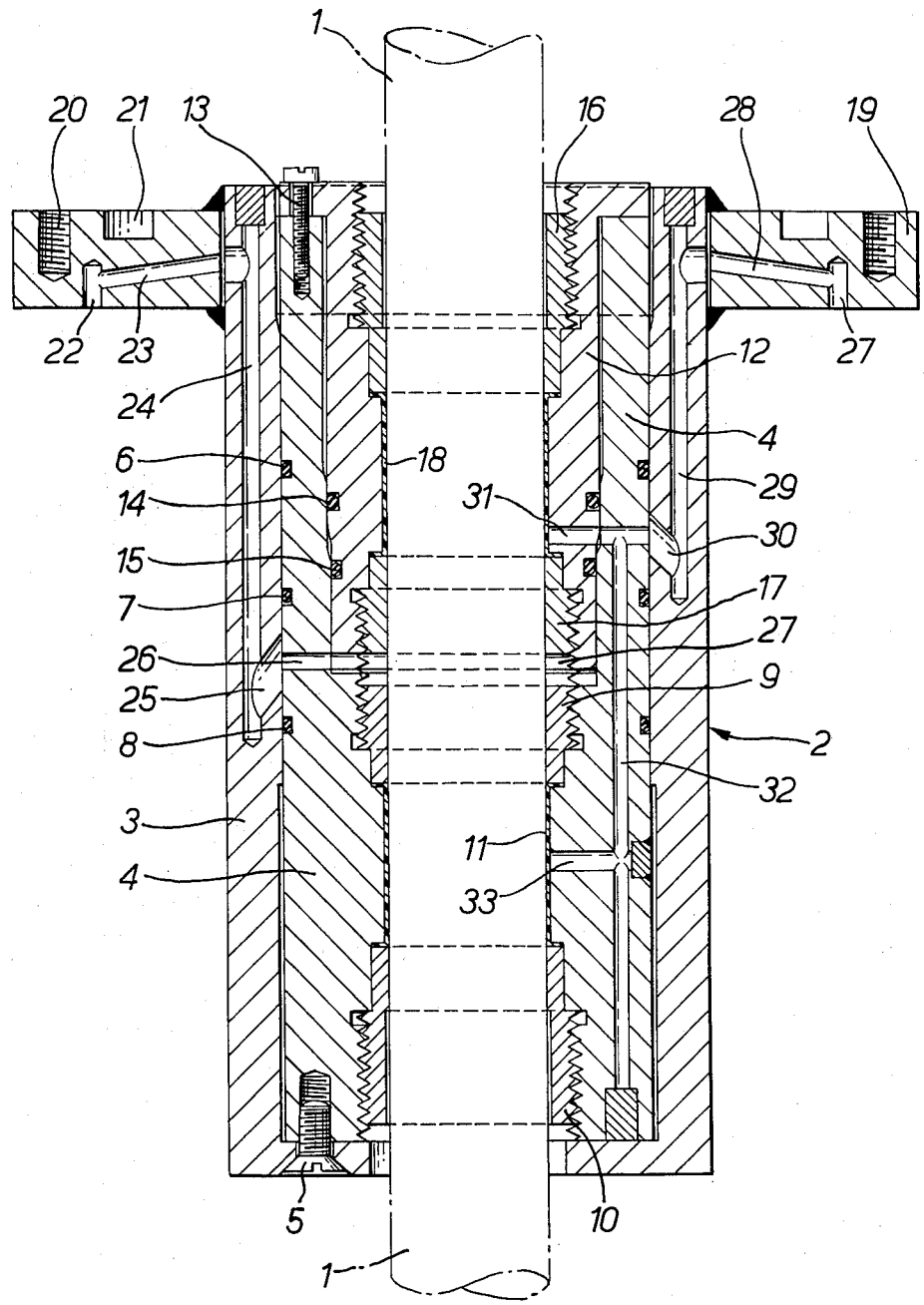

3,261,611
SHAFT SEAL SYSTEM FOR CONTROL ROD
OF NUCLEAR REACTOR
Leslie Maidment, Thurso, Caithness, Scotland, assignor to United Kingdom Atomic Energy Authority, London, England
Filed June 15, 1964, Ser. No. 375,241
Claims priority, application Great Britain, June 14, 1963, 23,785/63
3 Claims. (Cl. 277—34)

This invention relates to shaft seals and is more particularly concerned with shaft seals having an application in nuclear reactor control systems.

By way of explanation of such particular application, there are methods of controlling nuclear reactors which include movement into and out of a nuclear reactor core of control rods. The control rods may be of material having a high capture cross-section for neutrons or may be fissile material. Such rods are usually moved by some form of drive mechanism situated outside the reactor vessel and there is thus a requirement for a shaft seal where the control rod, or a transmission member for a control rod, passes through the vessel. The term "control rod" as hereinafter used is intended to include within its scope a transmission member for a control rod.

According to the present invention there is provided for a low speed shaft seal a housing in which is supported an impervious pellicular sleeve to encircle the shaft, the housing having an adjacent supporting wall over the length of the sleeve and a passageway through which to apply fluid pressure to the sleeve for urging it into sealing contact with the shaft. Preferably the pellicular sleeve is made of a synthetic plastics material such as nylon or P.T.F.E., and can be regarded as a resilient diaphragm closely embracing the shaft, the housing being so dimensioned as to leave between it and the shaft a clearance just sufficient to accommodate the sleeve without unduly restricting movement of the shaft. For a shaft of 1.25" outer diameter it is considered that the maximum wall thickness of the sleeve would be about 0.020" and the length of the sleeve at least equal to the shaft diameter.

Whilst the sleeve may serve to provide a positive seal, it is also envisaged that it may be utilised to reduce or restrict the flow of a purge gas fed to the housing. Thus with a housing having a passageway communicating with the shaft at a region intermediate the ends of the housing such that purge gas fed through the passageway flows in both axial directions between the shaft and the housing, impervious pellicular sleeves may be provided, one to either side of the region at which the passageway communicates with the shaft, in order to throttle the flow of purge gas when the sleeves are subjected to a suitable centripetal fluid pressure.

By way of example, a nuclear reactor control system embodying one particular form of the invention will now be described with reference to the single figure of the accompanying drawing which is a sectional elevation.

The drawing shows a shaft in the form of a control rod 1 movable axially in a bore in a housing 2. The housing 2 comprises an outer casing 3 in which a lower housing member 4 is positoned by screws (one of which is shown and designated 5), sealing rings 6, 7 and 8 being provided. The member 4 is of counter-bored tubular form, and screw-threaded gland plugs 9, 10 are used to position an impervious pellicular sleeve in the form of a nylon sleeve 11. The sleeve 11 has flared end margins which are clamped by the plugs 9, 10 against ends of a flange on the member 4, and the main portion of the sleeve 11 encircles the rod 1. The flange on the member 4 forms or provides a supporting wall for the sleeve 11 over the length of the sleeve.

An upper housing member 12 is positioned in the member 4 of the casing 3 by screws (one of which is shown and designated 13), sealing rings 14, 15 being provided between the members 4, 12. The member 12 is also of counterbored tubular form and screw-threaded gland plugs 16, 17 are used to position a nylon sleeve 18 identical to the sleeve 11. The sleeve 18 has flared end margins which are held by the plugs 16, 17 against ends of a flange on the member 12, and the main portion of the sleeve 18 encircles the rod 1. The flange on the member 12 forms or provides a supporting wall for the sleeve 18 over the length of the sleeve.

The housing 2 also comprises a flange ring 19 welded to the upper end of the casing 3, the ring 19 having screwed holes 20 and an annular recess 21 for a sealing ring used to secure and seal the housing to a reactor vessel plate or shield plug (not shown). The housing 2 has a first passageway comprising an inlet 22 and branches 23 to 26 communicating with the rod 1 at an interspace 27 between the upper and lower end faces of the plugs 9, 17 respectively. The sealing rings 7, 8 are respectively positioned above and below the junction between the branches 25, 26. The housing 2 has a second passageway comprising an inlet 27 and branches 28 to 33, the branch 31 communicating with the outer surface of the sleeve 18 and the branch 33 communicating with the outer surface of the sleeve 11.

Typical dimensions are as follows:

| | Inches |
|---|---|
| Diameter of rod 1 | 1.247 |
| I.D. of sleeves 11, 18 | 1.250 |
| O.D. of sleeves 11, 18 | 1.280 |
| Length of main portions of sleeves 11, 18 | 1.25 |
| I.D. of members 4, 12 where supporting main portions of sleeves 11, 18 | 1.228 |

It can be seen from these dimensions that the sleeves 11, 18 are in effect resilient diaphragms (0.015" thick) closely embracing the rod 1, whilst the members 4, 12 have just sufficient clearance with the rod 1 to accommodate the main portions of the sleeves 11, 18 without unduly restricting movement of the rod 1. The main portions of the sleeves 11, 18 are of a length equal to the rod diameter.

Gas feed pipes passing through the reactor vessel plate or shield plug are connected to the inlets 22, 27 and in use a pressurized purge gas is fed to the interspace 27 via the inlet 22 and branches 23 to 26. From the interspace the purge gas flows in both axial directions between the rod 1 and housing 2. Thus the purge gas flowing upwardly from the interspace serves to prevent inleakage of ambient gas whilst the purge gas flowing downwardly from the interspace serves to prevent outleakage of gas in the reactor. A pressurized sealing gas is fed through the inlet 27 and branches 28 to 33 to create a centripetal fluid pressure acting on the sleeves 11, 18 thereby urging them into sealing contact with the rod 1. In this way the flow of purge gas from the interspace 27 is considerably reduced or throttled. By way of example, if the purge gas pressure is 50 p.s.i. and the sealing gas pressure 55 p.s.i., then for a system of the dimensions given above the total flow of purge gas from the interspace is about 0.25 cu.ft./hr., compared with a total flow from the interspace of 2.5 cu.ft./hr. when there is no supply of pressurised sealing gas to the sleeves 11, 18. Thus the flow of purge gas is reduced by a factor of ten. Increasing the difference between the sealing gas and purge gas pressures further reduces the purge gas flow. Thus for a 57.5 p.s.i. sealing gas pressure, the purge gas flow is reduced by a factor of one hundred.

Where the reactor is cooled by liquid metal such as liquid sodium, the free surface of the sodium is desirably blanketed by an inert gas such as argon, and the purge gas and sealing gas are then conveniently argon as well. Materials other than nylon may be used for the sleeves 11, 18, such as for example P.T.F.E. which reduces the friction factor. For present purposes, nylon has the advantage of high resistance to corrosion by sodium vapours.

The sleeves 11, 18 are of course subject to wear by movements of the rod. However, such movement is not normally at high speed in a control system; it is considered that the sleeves are capable of a reasonable life not only for axial movement, but for rotational movement also. In the latter respect, the rotary drive for a winch, as in a nuclear fuel element charging machine, is suitable for sealing in this manner. The provision of a second similar housing would facilitate replacement of of the sleeves when necessary.

The pellicular character of the impervious sleeve is based on the concept of providing a sealing member in the form of a skin thin enough to conform to the contour of the shaft so that surface irregularities on the shft do not give rise to excessive leakage, whilst at the same time remaining coherent. In this context it is desirable that the housing should closely surround, i.e. be adjacent to, the sleeve over the length of the sleeve so that undue deformation of the sleeve, such as might otherwise occur by stretching due to the fluid pressure applied, is avoided.

I claim:

1. A nuclear reactor control system comprising a control rod, a housing through which the rod extends, the housing having a first passageway for admission of purge gas, the first passageway communicating with the rod at a region intermediate the ends of the housing whereby purge gas fed through the first passageway flows in both axial directions between the rod and the housing, impervious pellicular sleeves supported in the housing, one to each side of said region, to encircle said rod, said housing having an adjacent suportnig wall over the length of each sleeve, and having second and third passageways through which to apply sealing gas at a pressure greater than that of the purge gas to the sleeves for urging the sleeves into sealing contact with the rod thereby to throttle said flow of purge gas.

2. A control system as claimed in claim 1, wherein the sleeves are made of a synthetic plastics material and have a maximum wall thickness of 0.020″.

3. A control system as claimed in claim 1, wherein the sleeves have flared end margins and said housing has inwardly extending flanges defining said supporting walls for said sleeves and serving to locate said end margins, the clearances between said supporting walls and said rod being just sufficient to accommodate said sleeves without unduly restricting movement of said rod.

References Cited by the Examiner

UNITED STATES PATENTS

| | | | |
|---|---|---|---|
| 980,282 | 1/1911 | Junggren | 277—59 |
| 2,650,116 | 8/1953 | Cuny | 277—3 |
| 2,726,883 | 12/1955 | Taylor | 277—71 |
| 2,731,282 | 1/1956 | McManus et al. | 277—59 |
| 2,814,512 | 11/1957 | Quinn et al. | 277—3 |
| 3,031,397 | 4/1962 | Fortescue et al | 176—22 |
| 3,149,846 | 9/1964 | Verbeek | 277—71 |
| 3,154,472 | 10/1964 | Shannon | 176—36 |
| 3,170,844 | 2/1965 | Nicoll | 176—36 |

FOREIGN PATENTS

| | | |
|---|---|---|
| 588,064 | 5/1947 | Great Britain. |

OTHER REFERENCES

Thomas: Abstract of application Serial No. 659,735, published April 18, 1950.

L. DEWAYNE RUTLEDGE, *Primary Examiner.*

REUBEN EPSTEIN, *Examiner.*

M. R. DINNIN, *Assistant Examiner.*